United States Patent [19]
Aignesberger et al.

[11] 3,870,671
[45] Mar. 11, 1975

[54] METHOD FOR DISPERSING

[75] Inventors: Alois Aignesberger, Trostberg;
Ulrich Kriele, Traunreut; Horst Michaud, Trostberg, all of Germany

[73] Assignee: Suddeutsche Kalkstickstoff-Werke AG, Postfach, Germany

[22] Filed: Apr. 4, 1973

[21] Appl. No.: 347,893

[30] Foreign Application Priority Data
Apr. 13, 1972 Germany.............................. 2217929

[52] U.S. Cl. .......... 260/29.4 R, 252/355, 260/39 P, 260/67.6 R
[51] Int. Cl...... C08g 9/32, C08g 9/30, C08g 51/24, B01f 17/52
[58] Field of Search .................. 260/29.4 R, 67.6 R; 252/355

[56] References Cited
UNITED STATES PATENTS

| | | | |
|---|---|---|---|
| 3,645,973 | 2/1972 | Schibler ......................... | 260/67.6 R |
| 3,661,829 | 5/1972 | Aignesberger et al. ........ | 260/29.4 R |
| 3,748,290 | 7/1973 | Reingen ......................... | 260/67.6 R |

*Primary Examiner*—Melvin Goldstein
*Assistant Examiner*—W. C. Danison
*Attorney, Agent, or Firm*—Curtis, Morris & Safford, P.C.

[57] ABSTRACT

A process for dispersing finely divided solids by melamine-formaldehyde resins which are modified with sulfite, amidosulfonic or sulfonic acid groups and treated to enhance their dispersion action.

5 Claims, No Drawings

METHOD FOR DISPERSING

This invention relates to dispersing agents; more particularly, this invention relates to a new use of a condensation product of melamine, formaldehyde and sodium bisulfite as a dispersing agent for weakly acid, neutral or alkaline aqueous solution, when processed in a certain manner to improve its efficiency.

The production of melamine, formaldehyde and sodium bisulfite condensation products is described in German unexamined Application for Patent No. 1,671,017. Under the molar conditions indicated therein, there are produced non-thermosetting resins which, however, can be diluted with any desired quantities of water. The molecular weight of these condensation products is between 5,000 and 50,000.

A resin prepared in accordance with U.S. Pat. No. 2,407,599 in approximately the same molar ratio and recommended for use in textile finishing is also soluble in water, however it is hardened by heat; furthermore, as determined from the viscosity of their 50% solution, the disclosed resins have a very low molecular weight. A molecular weight of more than 5,000,000 has been shown for resins which are obtained in accordance with the procedure disclosed in U.S. Pat. No. 2,730,516 and these resins are suitable as thickening agents as well as sedimentation accelerators. However, neither type of the prior art resin disclosed in the two U.S. patents has any dispersing effect.

Since the resins prepared in accordance with German Unexamined Application for Patent No. 1,671,017 do not have any surface-active properties, it was a surprising discovery that these resins are excellent dispersing agents for finely divided, water-insoluble solids. These resins have a wide range of applications, for instance in coatings for the paper industry, in emulsion paints for building exterior and interior paints, in clay muds for the manufacture of ceramic articles, and also in connection with those clay minerals which contain no humic acids and therefore can only be liquified with difficulty by addition of soda.

An excellent dispersing action is obtained upon the liquifaction of high solid contents in a very small amount of liquid; the use of the resins is also advantageous in the wet grinding of solids since they lead to the reduction of the time of grinding and the energy required and foaming is not to be expected.

The dispersing action consists in a deflocculation of particle agglomerates, a stabilization of the suspension occuring as a result of surface adsorption by increase of the negative zeta potential. The dispersing action is measured by comparison of the viscosities of the resultant suspensions, by determination of the fineness of grinding with a grindometer (in accordance with Hegmann method), or by determination of the rate of sedimentation.

The melamine resins modified with sulfite or sulfonic acid which are used as dispersing agents develop their activity in the weakly acid, neutral and alkaline ranges, and most pronouncedly in the pH range above a pH of 6.5.

Since the sulfite- or sulfonic-acid-modified resins condense initially under soda-alkaline, and therefore under sulfuric acid conditions, and finally are made weakly alkaline again by caustic soda, they contain portions of sodium sulfate. It has now been discovered that if the sodium sulfate content is removed, for instance by dialysis, the dispersing action of the resins is further strengthened.

For the solving of special problems in dispersion, the replacement of the sodium ion, for instance by potassium or ammonium, magnesium, calcium or barium is advisable. Cations which are derived from organic bases such as, for instance, pyridine, morpholine or trihydroxy lower alkyl amine, e.g., triethanolamine are advantageously employed.

The melamine resins modified by sulfite or sulfonic acid finally also have a special characteristic inasmuch as they retain their dispersing action even in cases where, as a result of high hardness of the water used of up to 40° German hardness, certain electrolyte-sensitive pigments such as, for instance, anatase normally tend to flocculate out.

In cases in which the wetting action of the resins is insufficient, this can be improved by the addition of suitable commercial nonionic surface-active agents such as, for instance, derivatives of polyethylene glycol.

PREPARATION OF RESINS

A. 567 parts by weight of 37 % aqueous formaldehyde was adjusted to a pH of 4.5 with sodium hydroxide. Thereafter 294 parts by weight of melamine were added to said formaldehyde solution, and the whole heated to 75°C until a clear solution formed. After cooling of the solution to 45°C, 222 parts by weight of $Na_2S_2O_5$ were added. Finally, 332 parts by volume (cc) of water were added and with sodium hydroxide the pH value adjusted to 10.5 while the solution was heated for 2 hours at 80°C.

After cooling of the solution to 50°C, the solution was reacted with a mixture of 2,116 parts by volume (cc) of water and 70 parts by weight of concentrated sulfuric acid. Thereafter the reaction mixture was heated for 5 hours at 50°C and then adjusted to a pH of 8.7 with sodium hydroxide. A water soluble solution (in all proportions) was obtained which had at a 20% solids content a viscosity of 37 centipoises (at 25°C).

B. 567 parts by weight of 37 % aqueous formaldehyde solution was adjusted to a pH of 4.5 with sodium hydroxide and thereafter 294 parts by weight melamine reacted therewith. The reaction solution was then warmed to 75°C until a clear solution formed which was cooled to 45°C and then reacted with 222 parts by weight $Na_2S_2O_5$. Finally 332 parts by volume (cc) water was added and sodium hydroxide was added to obtain a pH value of 9.0. The solution was heated for 2 hours at 80°C. After dilution with 2,000 parts by volume (cc) water, the solution was cooled; and the product at a 20 % solids content had a viscosity of 26.2 centipoises at 25°C.

C. 20 parts by weight of hexamethylol melamine was reacted with 6 parts by weight of Rongalit* by heating at 90°C for 3 hours. A clear solution was obtained which had a viscosity of 1.3 centipoises at 20°C and at a solids content of 10 %.

*Rongalit is sodiumsalt of formaldehyde sulfoxylic acid

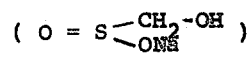

Similar resin solutions were obtained which can be converted to other acid functions (based on sulphur groups) by using instead with Rongalit, dithionite, sulfite, bisulfite, or pyrosulfite.

On basis of the viscosity measurements and appropriate comparisons with known compounds, the molecular weight of the resins is approximately from 5,000 to 50,000.

The dispersing action of the resins is explained below in a few examples.

EXAMPLE 1

100 parts by weight of a fly ash (dush) such as obtained in the manufacture of ferrosilicon and is essentially characterized by the fact that it has more than 90 % by weight high dispersed silica with a surface, determined in accordance with a sub-sieve sizer of 20 m²/g and a particle size of 93% < 10µm, are formed into a paste with 100 parts by weight of water of 13.5° German hardness. To the crumbly mass which is thereby formed there are added increasing quantities of the solution designated as A above. Upon an addition of only 0.5% active substance, there is formed a pulpy mass which becomes increasingly liquid upon further addition. The best possible liquifaction is obtained with an addition of 2.3% solid resin, referred to suspension, with a value of 117 poise.

EXAMPLE 2

100 parts by weight of the aqueous resin solution indicated in Example 1 are dialyzed in a dialysis apparatus customary for laboratory purposes for 20 hours in a stream of tap water. The dialysis-effective surface is 100 cm². As membrane, "Cuprophan," Type 450 PT, of the Bemberg Company is used. Upon the interruption of the dialysis, the neutral salt content has been removed to 98% of the original content, while the content of the condensation product is only 1% less than the original content. A solution containing 9.5% (solids basis) condensation product is obtained.

a. 60 parts by weight of a China clay such as customarily used for the coating of paper are formed into a paste with 40 parts by weight of water of 13.5° German hardness. The viscosity of this composition is not measurable by ordinary means. Upon the addition of 2% condensation product A of Example 1 (corresponding to 10 parts by weight of the 20% aqueous solution), a clay mud of 51 poise is obtained.

b. The dialyzed resin solution is used in a parallel test, the viscosity of the mud decreasing to 4.2 poise upon an addition of only 1% solid resin.

EXAMPLE 3

100 parts by weight of a clay which can only be liquified with difficulty by means of soda are stirred with sufficient water to form a thinly liquid mud with a flow-out time of 10 DIN-sec (6 mm nozzle).

The same experiment is repeated with an addition of 0.2% sodium carbonate, referred to kaolin, and with 0.2% of the condensation product (solid basis) used in Example 1. The following table shows the amount of water necessary in each case in order to obtain 10 DIN-sec fluidity.

|  | Without addition | Addition of sodium carbonate | Addition of resin |
| --- | --- | --- | --- |
| Kaolin (g) | 100 | 100 | 100 |
| Sodium carbonate (%) | — | 0.2 | — |
| Condensation product (%) | — | — | 0.2 |
| Water (ml) | 250 | 210 | 150 |

The liquifying action as dispersing effect shows itself clearly in the saving of 40% water, while the soda customarily used as liquifying agent reduces the water requirement by 16%.

EXAMPLE 4

A titanium dioxide pigment (anatase) which in itself is readily dispersible in soft water tends to flocculate out in hard water. In order to detect the effectiveness of the dispersing agent with respect to the water-hardness-forming ions, the following procedure is employed:

10 parts by weight each of the anatase pigment are dispersed in 100 parts by weight of water of 0° German hardness and a pH of 4.9.

Parallel to this, two dispersings are carried out with the dialyzed condensation product of Example 2 and 2 parts by volume of the 10% solution, corresponding to 2% active substance, referred to pigment, are added.

The dispersing action is established by determination of the suspendability after filling 100-g portions of the suspension into standing cylinders. The pigment maintained in suspension after a standing time of 2 hours at room temperature (25°C) in the upper 10 ml, in % to the weighed portion of pigment, gives the percentage dispersing action.

The following values are obtained:

|  | Percentage dispersing power | |
| --- | --- | --- |
|  | 0° German hardness | 40° German hardness |
| Without addition | 76 | 0 |
| With addition | 78 | 62 |

The example shows that even electrolyte-sensitive pigments can be dispersed sufficiently by the said condensation product.

EXAMPLE 5

100 parts by weight of the approximately 10% aqueous dialyzed resin solution obtained in accordance with Example 2 are converted on weakly acid cation exchanger into the free sulfonic acid. The resultant solution of a pH of 3 is concentrated to a content of 28.8% and treated with triethanolamine until obtaining a pH of 7.5.

10 parts by weight of lamp black are ground in a grinding dish with 5 parts by weight of water to form a pasty composition. The degree of grinding was found by measurement with a grindometer to be 0 – 1 NS (Hegmann), which corresponds to a particle size of 90–100µm. Upon addition of 0.1 part by weight of the solution of the 2,2',2''-trihydroxy-triethyl-ammonium sulfonate, liquifaction occurs immediately upon grinding and the degree of grinding gives a Hegmann value of 8 NS, corresponding to a particle size of <1µm.

Instead of the triethanol amine, the other bases mentioned previously may be employed after the ion exchange of the resin.

EXAMPLE 6

A resin prepared according to the procedure B' given below was dried at 40°C under vacuum and thereafter ground to a fine powder. In order to test the dispersion effect two compositions I and II were prepared as given below by dry grinding in a pin mill and compared as follows. The suspendability of the obtained compositions was determined according to the method designated by World Health Organization (but different from the method given in Example 4). The suspendability was determined after 30 minute rest period of the two compositions in a glass cylinder container.

| COMPOSITION | I (parts by weight) | II (parts by weight) |
| --- | --- | --- |
| Atrazin[1] | 50 | 50 |
| chalk slurry | 36.5 | 36.5 |
| wetting agent[2] | 0.5 | 0.5 |
| dispersing agent (described below) | — | 3 |
| suspendability according to WHO | 7 | 90 |

[1]Atrazin is 2-Ethylamine-4-chloro-6-isopropylamine-1,3,5-triazine
[2]wetting agent is Iso-tridecylepolyglycolether Resin B'

To 400 parts by weight of 30 % aqueous formaldehyde which was adjusted to a pH of 8.2 were added 126 parts by weight of melamine, and warmed to 80°C until a clear solution formed. Then the solution is heated to its boiling point and a solution of 97 parts by weight of amidosulfonic acid is added, whose pH-value was adjusted to pH 7.2 by a diluted aqueous sodium hydroxide. After adding the amido-sulfonic acid solution heating is continued for further 5 minutes. During the solution is cooled down are added 500 parts by weight of water. A water soluble solution (in all proportions) was obtained which had at a 27 % solids content at 20° C a viscosity of 14 centipoise (Brookfield Rot. Visc. 20 v.p.m., spindle nr.1).

In addition to the finely divided particles which are of an average diameter 0.5 to 2.0 μm as used in the Examples above, the following finely divided particles may be dispersed by the resins illustrated herein: Anatase, carbon-black, calciumcarbonate, silicium-dioxide etc.

The amount of resin which is employed for dispersing the finely divided particles is from 1 per cent by weight to 10 per cent by weight. A preferred range is from 1.5 per cent by weight to 3.5 per cent by weight. For purposes of grinding, the amount of resin which may be added is from 1 per cent by weight to 5 per cent by weight. The lowest pH value at which these resins are still operable is 5.

What is claimed is:

1. A method for dispersing finely divided, water-insoluble solids, comprising dialyzing a sulfite, amidosulfonic acid or sulfonic acid modified melamine-formaldehyde resin, the sulfite or sulfonic acid group of which is in the form of a sodium salt, said resin being of a molecular weight between 5,000 and 50,000, admixing said resin in an amount from 1 to 10 percent by weight with said finely divided water-insoluble solid, in an aqueous medium having a pH range above 6.5 and dispersing said solid in said aqueous medium in the presence of said resin.

2. The method as defined in claim 1 and wherein the aqueous medium has a hardness between 0° and 40° German hardness.

3. The method as defined in claim 1 wherein said sodium sulfonate or sodium sulfite groups are converted to free acid groups by ion exchange which are further converted to the salts of potassium, ammonium, magnesium, calcium, barium, pyridine, morpholine, or triethanolamine and said resin is then admixed with said finely divided, water-insoluble solid, sought to be dispersed.

4. The method as defined in claim 1 and wherein said resin is used in combination with a non-ionic wetting agent.

5. The method as defined in claim 1 and wherein the finely divided water-insoluble solid is fly ash, clay, kaolin, anatase, lamp black, or chalk.

* * * * *